United States Patent
Morris et al.

(10) Patent No.: US 7,966,705 B2
(45) Date of Patent: Jun. 28, 2011

(54) SELF-PIERCING BLIND RIVET

(75) Inventors: Stephen Morris, Sutton Coldfield (GB); Dan Smith, Birmingham (GB)

(73) Assignee: Newfrey LLC, Newark, DE (US)

( * ) Notice: Subject to any disclaimer, the term of this patent is extended or adjusted under 35 U.S.C. 154(b) by 100 days.

(21) Appl. No.: 12/075,138

(22) Filed: Mar. 7, 2008

(65) Prior Publication Data
US 2008/0178454 A1    Jul. 31, 2008

Related U.S. Application Data

(62) Division of application No. 10/654,072, filed on Sep. 3, 2003, now Pat. No. 7,341,413.

(30) Foreign Application Priority Data

Sep. 9, 2002   (GB) .................................. 0220824.7

(51) Int. Cl.
    *B23P 11/00* (2006.01)
(52) U.S. Cl. .................. 29/243.521; 29/243.53; 29/523; 29/524.1
(58) Field of Classification Search ............ 29/512, 29/509, 523, 524.1, 525.06, 243.521, 243.53, 29/243.522, 243.529
    See application file for complete search history.

(56) References Cited

U.S. PATENT DOCUMENTS

| | | | |
|---|---|---|---|
| 2,789,619 A * | 4/1957 | Wing et al. ............. | 29/243.524 |
| 3,276,499 A | 10/1966 | Reusser | |
| 3,279,304 A | 10/1966 | Hopkins | |
| 3,559,445 A | 2/1971 | Hougen | |
| 3,750,518 A | 8/1973 | Rayburn | |
| 4,003,288 A | 1/1977 | Jeal | |
| 4,218,953 A | 8/1980 | Haytayan | |
| 4,428,214 A | 1/1984 | Head, Jr. et al. | |
| 4,629,380 A | 12/1986 | Gunkel et al. | |
| 4,781,500 A | 11/1988 | Mauer | |
| 5,054,977 A | 10/1991 | Schultz | |
| 5,056,207 A | 10/1991 | Ladouceur | |
| 5,252,014 A | 10/1993 | Andrews | |
| 5,441,417 A | 8/1995 | Ladouceur et al. | |
| 5,469,610 A * | 11/1995 | Courian et al. ......... | 29/243.521 |
| 5,618,142 A | 4/1997 | Sondén et al. | |
| 5,644,830 A | 7/1997 | Ladouceur et al. | |
| 5,722,144 A | 3/1998 | Bora | |
| 5,752,305 A | 5/1998 | Cotterill et al. | |

(Continued)

FOREIGN PATENT DOCUMENTS

DE        1750560       3/1971

(Continued)

*Primary Examiner* — David P Bryant
*Assistant Examiner* — Christopher M Koehler
(74) *Attorney, Agent, or Firm* — Harness, Dickey & Pierce, P.L.C.

(57) ABSTRACT

A self-piercing blind fastener comprising a mandrel having an elongate cylindrical shell mounted on a stem of such mandrel and which extends co-axially about a central elongate axis of the blind fastener, the shell having a radially extending flange at one end and a tail-end portion at the opposite end for insertion through a workpiece, the mandrel further having a mandrel head in operative engagement with the tail-end of the fastener for transmitting a setting force thereto during setting of such fastener, the blind fastener further comprising a longitudinally extending indenting member extending co-axial with and away from the tail-end of the blind fastener, which indenting member having a cross sectional area less than the cross sectional area of the shell.

12 Claims, 6 Drawing Sheets

U.S. PATENT DOCUMENTS

| | | |
|---|---|---|
| 5,915,901 A | 6/1999 | Aasgaard |
| 6,042,313 A | 3/2000 | Dehlke |
| 6,254,324 B1 | 7/2001 | Smith et al. |
| 6,263,560 B1 | 7/2001 | Edwards |
| 6,276,050 B1 | 8/2001 | Mauer et al. |
| 6,325,584 B1 | 12/2001 | Marko et al. |
| 6,338,601 B1 | 1/2002 | Mauer et al. |
| 6,362,448 B1 | 3/2002 | Röser |
| 6,385,843 B1 | 5/2002 | Singh et al. |
| 6,398,472 B1 | 6/2002 | Jones |
| 6,428,255 B1 | 8/2002 | Smith |
| 6,502,008 B2 | 12/2002 | Maurer et al. |
| 6,663,329 B2 | 12/2003 | Singh et al. |
| 6,802,682 B2 | 10/2004 | Stevenson et al. |
| 6,814,531 B2 | 11/2004 | Stevenson et al. |
| 6,817,074 B2 * | 11/2004 | Lalonde et al. .......... 29/243.521 |
| 6,877,646 B2 | 4/2005 | Paynter |
| 2002/0125297 A1 | 9/2002 | Stol et al. |
| 2003/0175095 A1 | 9/2003 | Clarke |
| 2003/0177626 A1 | 9/2003 | Paynter |
| 2004/0068854 A1 | 4/2004 | Kato et al. |
| 2004/0071526 A1 | 4/2004 | Lesecq |
| 2004/0162151 A1 | 8/2004 | Mauer et al. |
| 2005/0008455 A1 | 1/2005 | Guy |

FOREIGN PATENT DOCUMENTS

| | | |
|---|---|---|
| GB | 1 289 819 | 9/1972 |
| GB | 2 038 979 A | 7/1980 |
| GB | 2107626 | 5/1983 |
| IT | 1 113 461 | 1/1986 |
| JP | 11153114 A | 6/1999 |
| JP | 2000141066 | 5/2000 |

* cited by examiner

SELF-PIERCING BLIND RIVET

CROSS-REFERENCE TO RELATED APPLICATIONS

This application is a divisional application of U.S. patent application Ser. No. 10/654,072 filed on Sep. 3, 2003, which claims the benefit of United Kingdom Application 0220824.7, filed Sep. 9, 2002. The disclosure of the above applications is incorporated herein by reference.

FIELD OF THE INVENTION

The present invention relates to a fastening element used to secure together two or more workpieces and, more particularly, towards a self-piercing blind fastener of the type comprising a collapsible cylindrical fastener having a flange at one end and a mandrel extending therethrough to effect deformation of such fastener during a setting operation. The invention is also directed to a die for use during the insertion of such self-piercing blind fasteners and an apparatus and method for the setting of such self-piercing blind fasteners.

BACKGROUND OF THE INVENTION

There are many types of known fasteners available for fastening together two or more workpieces, including two main classes of a) self-piercing rivets and b) blind fasteners (specifically blind rivets). In particular, conventional blind rivets comprise an outer tubular shell or body having an enlarged flange at a first end, together with a mandrel associated therewith, such mandrel comprising a cylindrical stem extending through the tubular rivet body so as to be co-axial therewith, whereby the mandrel stem will have mounted towards one end thereof a mandrel head for engagement with the second, opposite, end of the tubular shell (usually in the form of an enlarged head which engages an end-face of the tubular rivet body remote from the enlarged flange). The blind rivet is then passed through a preformed hole in the workpiece until the flange engages with the edge of the hole and is then held in engagement therewith during a setting operation. During setting, the remote end of the rivet, which is disposed inwardly of the workpiece (the blind side) is then compressed towards the flange by drawing the mandrel stem, and hence the mandrel head, back towards the flange, whereby the engagement of the mandrel head with the rivet body effects compression of the tubular body between the flange and the remote end of the rivet, which deformed portion of the rivet body then compresses the workpiece therebetween with the flange itself.

There are many variants in the design of such blind fasteners including the provision of closed end blind fasteners, whereby the tubular body has the end opposed to the flange member which is substantially sealed and encapsulating the mandrel head (which engages with a reduced diameter inner surface of the tubular body to effect deformation during the setting operation), or alternatively the mandrel head may comprise a screw threaded member for complimentary screw threaded engagement with an internal surface of the cylindrical rivet body to allow a setting operation and deformation of the rivet. One of the major advantages of such blind rivets and fasteners is that the workpiece only needs to be accessed from one side since deformation of the "blind end" of the rivet is effected by a compressive force being applied thereto by drawing of the mandrel stem from the workpiece engaging side.

However, one of the major drawbacks of this type of blind fastener is the necessity that appropriate holes must be pre-drilled (or pre-punched) in the workpiece in order to allow the fasteners to be inserted therethrough for setting. Not only does this involve an additional manufacturing operation of pre-drilling (or punching) the holes, but maintaining one or more workpieces appropriately aligned following the drilling operation until the insertion of the rivet can be difficult. For example, there are instances in which the pre-formed holes are larger than specified due to the difficulties in hole alignment due to the accumulation of hole centre tolerances. This can occur where the workpiece is large and of relatively thin material (such as in an automotive body). Deformation of the hole edges during a punching operation can also result in holes of non uniform size and shape. Conventional blind rivets can also have difficulty in achieving the necessary hole filling and clamping performance in larger holes and there is also an attendant difficulty in insertion of the rivet through the workpiece materials due to hole mis-match. If the rivets cannot achieve good hole filling and clamping, especially where the joint is subjected to vibration or deflection, the parts can begin to move relative to one another resulting in squeaks and rattles.

To address such problems, self boring blind rivets have been developed which attempt to form the appropriate hole through the workpiece by use of a rotatable boring member formed on the rivet. However, the involvement and necessity of effecting rotation of the fastener prior to setting considerably complicates the required equipment to achieve such operation. In addition, due to the possible existence of small gaps between the workpieces during the self drilling operation, resultant displacement between such workpieces can occur when the rivets are set so that the quality of the rivet connection can suffer owing to shearing forces.

A further drawback of such rivets is the creation of debris during the rivet operation which could interfere with the rivet setting or be hazardous when used in securing electrical equipment.

A further, alternative fastener developed to address such problems is the self-piercing rivet, which effectively comprises a semi tubular rivet which is intended to be punched through an upper workpiece for its lower edge to be splayed into (but not penetrate) a lower workpiece, the splaying of the rivet being effected during a punching operation by use of an appropriate shaped die member placed beneath the workpieces. While effective, such punched tubular self-piercing rivets also incur certain drawbacks and notably requirement that the workpieces must be forcibly held together during setting and the inability to visually inspect the set rivet since it is, if correctly set, retained within the body of the lower workpiece. In addition, such self-piercing tubular rivets can only be used with workpieces of a minimum thickness to prevent their simply being punched through both workpieces and, since such rivets engage directly with the workpiece, they cannot be used in ductile materials such as plastics, where there are advantages in using a self-piercing blind rivet to achieve a reliable join.

It is therefore an object of the present invention to provide a self-piercing blind fastener which alleviates the aforementioned problems and specifically allows the setting of a blind fastener without the requirement of pre-drilling holes through the workpiece. It is also an object of the present invention to provide an appropriate supporting die and apparatus for inserting and fastening such self-piercing fasteners, together with an improved method of attaching blind fasteners to a workpiece which helps alleviate the aforementioned problems.

SUMMARY OF THE INVENTION

According to the present invention there is now provided a self-piercing blind fastener comprising a mandrel and an elongate cylindrical shell mounted on an elongate stem of the mandrel so as to extend co-axially about a central elongate axis of the blind fastener, the shell having a radially extending flange at one end thereof and a tail end at the opposite end for insertion through a workpiece; the mandrel having a mandrel head in operative engagement with the tail end of the shell for transmitting force thereto during setting of the fastener, characterised in that the blind fastener comprises a longitudinally extending indenting member extending co-axially with and away from the tail end of the blind fastener, this indenting member having a cross sectional area less than the cross sectional area of the cylindrical fastener. By reducing the cross sectional area of the indenting member, then the pressure applied to the workpiece as such fastener is forced there against is concentrated into this smaller area to more readily effect deformation and weakening of the workpiece to allow the fastener to be inserted therethrough. Preferably, the cross sectional area of the indenting member will be less than half (and ideally between 5% and 30%) of the cross sectional area of the cylindrical fastener itself.

For a conventional blind fastener, where the mandrel head extends at least partially through the shell so as to extend out of the tail end of such shell, the indenting member may be mounted on the mandrel head itself. Alternatively, for such blind fasteners having cylindrical closed-end shells, the indenting member may be mounted externally on a closed-end face of the tail-end of such shell.

In either of the aforementioned cases, the mandrel head will usually have a greater external diameter than the internal diameter of the cylindrical shell to thereby effect operative engagement between the enlarged head of the fastener and the cylindrical shell body. For open-end blind fasteners of this type, the external diameter of the mandrel head will usually correspond to the external diameter of the rivet body such that the head engages with an end-face of the cylindrical shell. Alternatively, for closed-end blind rivets, the mandrel head is retained within an end portion of the cylindrical shell and has an external diameter less than the external diameter of the fastener body but sits in an effective rebate on the internal surface of the shell.

Alternatively, the mandrel head may comprise an external screw thread for co-operative screw threaded engagement with an internal screw thread of the cylindrical shell in the region of the tail-end for effecting operative engagement therewith such that any force applied to the mandrel is transmitted through such screw threaded engagement to the cylindrical shell. In such an embodiment, the mandrel head itself may be retained within a closed-end shell or pass through an open-end cylindrical shell so as to project externally, and usually such external projection forming said indenting member.

Preferably, the indenting member will have an end-face extending at least partly perpendicular to the elongate axis of the fastener. Alternatively, or in combination, the end-face of the indenting member may be at least partially inclined so as to taper radially inwards towards the axis in a longitudinal direction away from the flange. Here such end-face may taper towards an apex or may taper towards a substantially flat surface extending at least partly perpendicular to the elongate axis. The end-face may also be domed.

Usually, the indenting member will also comprise a longitudinally extending side-wall so as to form a step portion extending from a periphery of the end-face towards the tail-end of the cylindrical body. Such a wall may extend parallel to the fastener axis or may be inclined thereto. Preferably the indenting member will comprise a cylindrical disk projecting away from the tail-end of the blind fastener.

Furthermore, it is preferred that the indenting member will also have associated therewith an axially inclined forming surface extending between the exterior diameter of the cylindrical shell and the indenting member. Such an inclined forming surface will preferable extend continuously between this indenting member and the external diameter of the shell or, alternatively, may extend partway therebetween. This inclined or tapered forming surface serves to deform the weakened portion of the workpiece as the fastener is pressed there against in an appropriate manner. Preferably such inclined surface face will be inclined relative to the fastener axis at an angle of between 50° and 80°. Where the blind fastener has an indenting member with an associated step portion, the inclined forming surface will extend between the exterior diameter of the shell at the base of the step portion.

Further, according to the present invention there is also provided a die for supporting a workpiece during setting of a self-piercing blind fastener, such die comprising a workpiece engaging support member having a cylindrical fastener receiving bore extending therethrough, which bore having a uniform mid section of constant diameter and a throat portion adjacent to an outer surface of the support member, which throat portion increasing in diameter towards this outer surface. Usually this increase in throat diameter will be non-linear such that the throat presents a substantially curved surface when viewed in cross section.

Preferably, the bore of such die will also comprise a radially extending shoulder between the mid section and the throat so as to form a cutting edge in the bore where such shoulder engages perpendicularly with the mid section.

Still further according to the present invention there is also provided a fastening system for inserting and setting a self-piercing blind fastener in a workpiece, such system comprising a die for supporting the rear of a workpiece during insertion of the fastener and a combined insertion setting tool, which combined insertion setting tool comprising an insertion member for engaging a shell of the blind fastener and for transmitting an insertion force thereto, together with a mandrel engaging member for engaging a mandrel stem of the fastener, which mandrel engaging member being displaceable relative to the insertion member for effecting relative displacement of the mandrel and the shell to effect setting of the blind rivet, further comprising displacement means for effecting relative displacement of the die and the combined insertion and setting tool linearly towards one another. Usually, the displacement means will comprise a hydraulic ram operatively engaged with one of the die or the combined insertion and setting tool with a frame member supporting the other of the die and the combined insertion and setting tool, whereby the hydraulic ram is displaceable towards the frame member so as to effect the relative displacement of the die towards the insertion and setting tool. Alternatively, both the die and the combined insertion setting tool may have associated rams to be both displaceable towards one another.

Still further according to the present invention there is also provided a method of attaching an elongate blind fastener to a workpiece comprising the steps of providing the fastener with an indenting member at one longitudinal end thereof remote from a flange of the fastener, which indenting member having a cross sectional area less than half the cross sectional area presented by a shell of the fastener, subsequently effecting relative displacement of the fastener towards the workpiece so as to bring the indenting member into engagement with such workpiece, following which applying an insertion force to the indenting member through the fastener to as to deform the workpiece and subsequently drive the fastener through the deformed, and subsequently weakened, workpiece until the fastener flange engages the workpiece, whereby the flange is then retained in engagement with the workpiece during setting of the blind fastener in a conventional manner. It is preferred the method further comprises the step of supporting a rear surface of the workpiece during deformation and penetration thereof by the fastener, usually by use of an appropriate forming die.

Preferred embodiments of the present invention will now be described, by way of example only, with reference to the accompanying illustrative drawings in which:

DETAILED DESCRIPTION OF THE PREFERRED EMBODIMENTS

Figure 1:
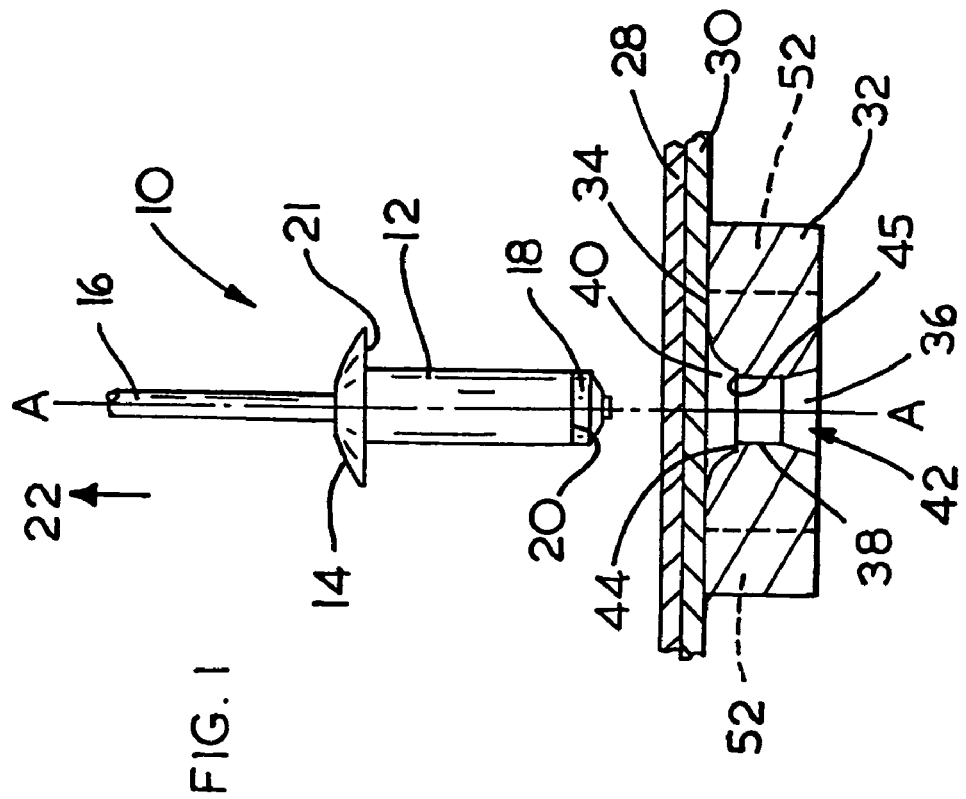
FIG. 1 is a schematic view of a self-piercing blind fastener according to the present invention aligned with an appropriate setting die (shown in cross section)

Referring now to FIG. 1 there is shown a self-piercing blind fastener, which in this example is a blind rivet, 10 comprising a hollow cylindrical metal body (rivet) 12, which is longitudinally extending and has an elongate central axis shown as 'A' in FIG. 1. At a first end of the cylindrical metal body 12 there is provided a radially extending domed flange member 14 having an outer diameter greater than the exterior diameter of the cylindrical body 12. The rivet 10 further comprises a mandrel having a cylindrical mandrel stem 16 which passes through the hollow metal body 12 so as to be co-axial therewith. The mandrel also comprises a mandrel head 18 mounted at one end of the mandrel stem 16 which engages with a tail-end 20 of the rivet body 12 in a conventional manner, and as clearly seen in FIG. 2. The mandrel head 18) is integrally formed on the mandrel stem 16 so as to be again be co-axial about axis A of the fastener and has a maximum outer diameter equivalent to the maximum outer diameter of the rivet body 12.

Extending radially between the mandrel stem 16 and the outer diameter of the mandrel head 18 is a shoulder portion substantially perpendicular to the mandrel stem 16 which engages and abuts the tail-end face 20 of the rivet body 12 as is conventional. The mandrel stem 16 has a diameter substantially equal to the inner diameter of the body 12 so as to be held in close fitting frictional engagement therewith. In this manner, blind rivets of this type are conventional and well understood within the art.

In operation, this type of conventional blind rivet will then be inserted through a preformed hole in one or more workpieces, which hole having been formed with diameter similar to the exterior of the diameter of the body 12, until such time an inner shoulder 21 of that the flange member 14 will abut an upper surface of such workpiece. An appropriate setting tool is then employed which has an outer rivet engaging portion which engages and holds the flange 14 firmly against the workpiece while the mandrel stem 16 is then grasped by an inner displaceable jaw mechanism and displaced in the direction shown generally by arrow 22 in FIG. 1 as the body 12 is restrained from displacement in such direction. The resultant compressive force effected by movement of mandrel 16 in direction 22 is then transferred, through the mandrel head 18, to the tail-end 20 of the rivet body 12 until sufficient force is exerted to result in compressive deformation of the cylindrical rivet body 12 towards the flange 14, with the deformed body 20 engaging the rear side of the workpiece so as to compress the workpiece or pieces between the flange 12 and the deformed tubular body 12 as shown substantially in FIG. 3. Engagement of the deformed portion with rear side of the work surface then prevents continued displacement of the mandrel stem 16 in direction 22, whereby a force exerted thereon subsequently increases until the mandrel fails at a preformed weakened region (or neck) as is again conventional. In this particular type of blind rivet the mandrel head will then be retained in engagement with the rivet body once the mandrel stem has been removed. This represents a conventional setting operation for a blind rivet.

Figure 2:
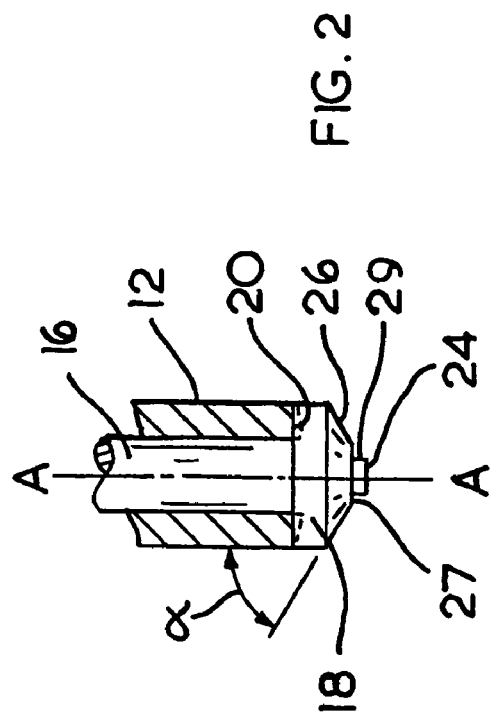
FIG. 2 is an enlarged part sectional view of a tail-end of the fastener of FIG. 1.
Figure 3:
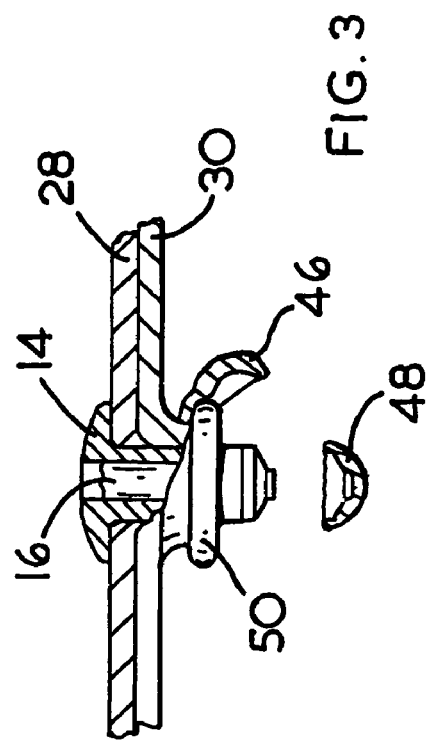
FIG. 3 is a part sectional view of the self-piercing blind fastener of FIG. 1 in a set configuration with associated workpieces.

The invention resides in the modification to this type of blind rivet and specifically for the embodiments shown in FIG. 1 through 3, to modification of the mandrel head 18. As best seen in the enlarged view of FIG. 2, the mandrel head 18 is further provided with an indenting member 24 which comprises a cylindrical solid disk mounted co-axial with the axis A of the fastener 10 and projecting longitudinally away from the rivet body 12 in a direction away from the flange 14. This indenting member 24 has a diameter significantly less than the maximum diameter of the rivet body 12 so as to present an end-face, perpendicular to axis A, having a cross sectional area significantly less than the cross sectional area defined by the diameter of the rivet body 12. In this embodiment, the diameter of the member 24 is approximately 25% of the diameter of the body 12 although such diameter can vary so as to preferably lie in the range of between 30% and 70% of the maximum diameter of the body 12, so as to present a cross sectional area less than 50% of that presented by the rivet body.

In this embodiment, the disk shaped indenting member is provided with an outer cylindrical side wall 29 which extends parallel to the axis (A), and supports substantially flat, circular end face, remote from the rivet body 12.

Ideally, the area presented by the end face of the indenting member 24 should be less than half the area presented by the cross sectional area of the rivet body 12 and such total area of the indenting member 24 will preferably lie within the range of 5% and 50% (although, ideally, between 5% and 30%) of the maximum cross sectional area of the body 12. The important feature here is that the indenting member 24 presents a workpiece engaging surface having a cross sectional area substantially less than that presented by the cross sectional area of the body 12.

The mandrel head 18 is further provided with an outwardly directed conical forming surface 26, again formed co-axial about axis (A), such conical surface 26 tapering from the maximum outer diameter of the mandrel head 18 towards the indenting member 24 in a direction away from the flange 14 of the fastener 10. This conical surface 26 may extend completely between the indenting member 24 and the outer diameter of the mandrel head 18 or, as shown in FIG. 2, may extend partially between these two extremes whereby a shoulder portion 27 is formed between the indenting member 24 and the forming surface 26, which shoulder portion extends substantially perpendicular to axis A.

Preferably, the conical forming surface 26 will be inclined at an angle α relative to the axis A, the angle α preferably lying within the range 30° to 80° and shown at an optimum angle of 60° in FIG. 2.

The main advantage of the modified design of blind rivet as shown in FIGS. 1 and 2 is the ability for such blind rivet to be inserted through a workpiece prior to setting without the necessity of pre-drilling holes therethrough. As shown in FIG. 1, the workpieces (in this particular example two sheets of thin metal 28 and 30) which are to be connected together, are supported by an improved design of die 32. This die 32 comprises an upper support surface 34 for receiving and supporting the rear of the workpiece 30 and has a bore 36 extending therethrough from this upper surface 34 so as to have a bore axis extending perpendicular to the upper surface 34. The bore 36 comprises a main tubular mid section 38 having a uniform cross section having a constant diameter, such diameter of the mid section 38 corresponding to the diameter of the tubular body 12 of the blind rivet. Adjacent to the upper support surface 34, the bore 38 extends into a throat portion 40 wherein the diameter of the throat portion increases towards the upper surface 34, whereby the increase in diameter is non-linear so that the rate of increase in diameter of the throat towards the upper surface 34 also increases so as to provide an internal curved surface of the throat portion as shown in FIG. 1. The opposed end of the mid section 38 of such bore is then provided with a clearance portion 42 which again has increasing bore diameter in a direction away from the support surface 34, such diameter of the clearance portion 42 increasing linearly away from the mid section.

As can also be seen from FIG. 1, the bore 36 is further provided with a stepped portion 44 between the mid section 38 and the throat portion 40, effected by a sudden increase in diameter between the mid section 38 and the inner end of the throat 40 subsequently creating a shoulder within the bore whereby the inner diameter of this shoulder (equal to the diameter of mid section 38) forms a cutting edge 45 as will be described below.

In operation, the workpieces 28, 30 are positioned on the upper surface 34 of the die 32, as shown in FIG. 1, whereby the blind rivet 10 is aligned with the die (by use of appropriate positioning and setting tools to be described below) such that the rivet axis A is aligned co-axially with the axis of the bore 36. Prior to the setting operation of the rivet 10, relative displacement between the rivet 10 and the die 36 is effected (again as will be described below) so as to bring the modified mandrel head 18 into abutment with a front surface of workpiece 28 so as to effect engagement of the outwardly directed end-face of the indenting member 24 with such workpiece 28. Continued relative displacement of the rivet 10 towards the die 34 results in the indenting member 24 stretching and deforming the workpieces 28, 30 into the throat 40 of the die 32, such deformation serving to cause a thinning of the workpieces, which weakened and thinned material is then engaged by the conical forming surface 26 of the mandrel head which, due to its weakened state, is readily displaced and formed against the throat 40 of the die, which serves to form the stretched workpiece materials to give a plunged hole therethrough (FIG. 3). Subsequently, as penetration of the indenting member 24 increases, the material stretch exceeds its yield strength and ruptures to either create an attached cap 46 (FIG. 3) or a separate pierced slug that can subsequently be removed through the bore of the die. Effectively, where the die is provided with an appropriate stepped portion 44 so as to form the cutting edge 45 as previously described, the deformed workpiece is forced against this cutting edge 45 so as to cut out the separate pierced slug 48 as the rivet is inserted therethrough. Alternatively (although not shown) the cutting edge of the bore can be removed such that the throat diameter blends smoothly with the diameter of the mid section of the bore whereby the absence of the such cutting edge will result in rupture of the weakened workpiece about approximately 90% of its periphery whereby the resultant cap 46 will then be retained on the rear of workpiece 30 as shown in FIG. 3.

Once the rivet has formed the plunged hole therethrough, the die may be wholly or partially withdrawn away from the rear of the workpiece simultaneously to activation of an appropriate setting tool (as will be described) to effect displacement of the mandrel 16 in the direction 22 as shown in FIG. 1 as previously described, so as to set the blind rivet 10 in a conventional manner and as shown in FIG. 3, whereby the workpieces 28, 30 are compressed between the flange 14 of the rivet body 12 and the deformed portion 50 of the body 12.

As mentioned, the die 32 may be wholly removed from the rear of the workpiece to allow the setting operation to be effected or may be partially removed (as indicated in dotted lines in FIG. 1) so as to remove the bore portion 36 away from the workpiece while the remaining end sections 52 of such die may remain to provide appropriate support to the workpiece.

A major advantage of self-piercing blind rivets of the type described above is achieved by the formation of an appropriate indenting member 24 having a cross sectional area significantly less than the cross sectional area of the rivet body. In this manner, the pressure applied to the workpiece through the rivet body can be concentrated so that a relatively low insertion force applied to the rivet is concentrated in a much smaller area thereby increasing pressure applied to the workpiece which allows the workpiece to be stretched as a result thereof and the resultant thinning of the workpiece by such a stretching operation then allows it to be more readily deformed by the larger forming surface 26. This allows for a significantly reduced force to be employed so as to achieve piercing of the rivet through a workpiece than would be normally be required by simply trying to force a rivet or mandrel head having the maximum diameter. This is important since one of the major requirements of this type of blind rivet is the ability to deform the body 12 of the rivet so as to achieve appropriate setting, necessitating a comparatively weakened rivet body (so as to be readily compressed during setting) which would be unable to transfer a high force to the mandrel head to achieve appropriate penetration. Thus the difficulties of the inherent weakness of the rivet body is overcome by the modified design utilising an indenting member having a significantly reduced cross sectional area.

Figure 8A:
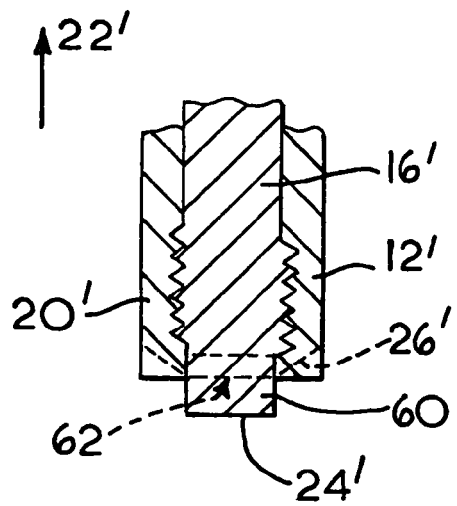
FIG. 8a is a cross sectional view of the tail-end of an alternative self-piercing blind fastener according to the present invention.
Figure 8B:
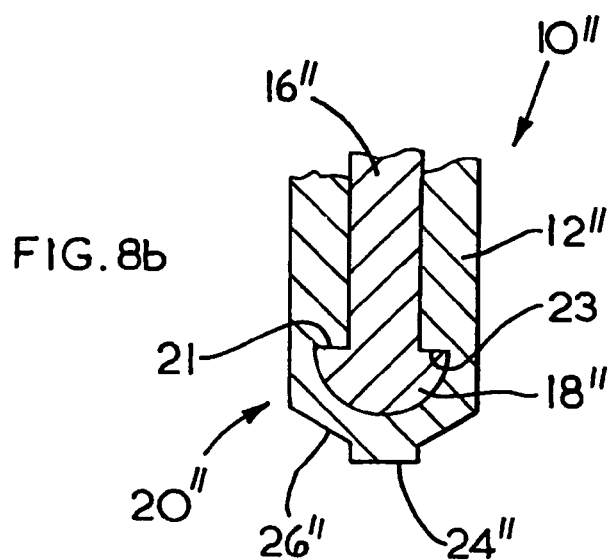
FIG. 8b is a cross sectional view of the tail-end of a second alternative self-piercing blind fastener according to the present invention.
Figure 8C:
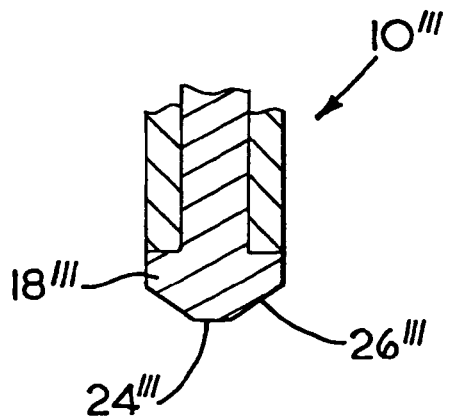
FIG. 8c is a partial cross sectional view of the tail-end of a third alternative embodiment of a self-piercing blind fastener according to the present invention.

Variations of this basic inventive concept and its application to similar and different types of blind rivets are readily conceived and, three examples of which are now shown in FIGS. 8a through 8c where like parts of their alternative fasteners utilise the same reference numerals. Firstly, referring to FIG. 8a, blind fasteners are also able to be set by effecting a screw threaded engagement between an outer screw thread on a mandrel stem 16' for complimentary engagement with an internal screw thread on a rivet body 12' so that displacement of the mandrel in the direction 22' relative to the rivet body 12' will again result in appropriate deformation of the rivet body in a conventional manner (an example of such blind fasteners is that sold by the applicant under the Trademark Popnut®). Again this conventional design of blind fastener can be modified so that an end portion 60 of the mandrel stem 16' projects externally past the tail-end 20' of the rivet body so as to form an indenting member 24', which is again mounted co-axial with the rivet body and has a cross sectional area considerably less than the cross sectional area defined by the outer diameter of the rivet body. Here the appropriate conical forming surface 26' can be optionally formed in the tail-end 20' of the rivet body (as illustrated by the dotted lines in FIG. 8a) or may be omitted completely. This conical forming surface 26' could also extend across the indenting member 24' such that the side walls of such dish shaped member are also inclined relative to the rivet axis. While such a conical forming surface 26' is preferable since it aids in the stretching and deformation of the weakened workpiece effected by the indenting member 24', the invention is equally applicable if such forming surface was perpendicular to the axis as shown in FIG. 8a as this will also eventually engage the weakened portion of the workpiece to continue stretching until appropriate failure allowing the rivet to be inserted therethrough. As can be also seen in FIG. 8a, the use of screw threaded engagement between a mandrel (or other fastening such as a bolt) within the fastener body need not extend through the tail-end 20' of the rivet body but may be retained therein, wherein the tail-end of the rivet body 20' may in fact be sealed (as again indicated by the dotted lines 62 in FIG. 8a). This type of rivet is known as a closed-end blind rivet and is again conventional within the field of fasteners and need not be described in any great detail. However, where such closed-end blind rivets are employed the indenting member may be formed directly on the sealed end of the rivet body. This is better shown in the embodiment of FIG. 8b showing a conventional closed-end blind rivet 10" having a mandrel stem 16" with an appropriate enlarged mandrel head 18" retained within a closed-end tubular rivet body 12", in a conventional manner such that the enlarged mandrel head 18" has a radially extending shoulder 21 which co-operates with an internal shoulder 23 formed on the inner surface of the rivet body 12". Such closed-end blind rivets are formed by inserting the mandrel head through the rivet body having a corresponding internal diameter and then passing the entire unit through an appropriate die so as to compress the rivet body around the inserted mandrel and mandrel head as shown. Such a closed-end blind rivet 10" as shown in FIG. 8b is then modified so as to encompass the present invention by forming a modified closed-end face at the tail-end 20", wherein this tail-end face is provided with an appropriate indenting member 24" and associated conical surface 26".

FIG. 8c shows yet a further variant of the present invention whereby a self-piercing blind rivet 10''' corresponds substantially to that shown in FIG. 1 with the exception of variation to the mandrel head 18''' and specifically the relationship between the conical forming surface 26''' and the indenting member 24'''. Here the indenting member 24''' simply comprises an end-face having a reduced diameter but without the stepped side wall portion 29 as shown in the embodiment in FIG. 2. Again, this indenting member 24''' is able to effect stretching of the workpieces as it is forced there against which stretching is continued by the inclined conical forming surface 26'''.

There are a considerable number of variants to the present invention, which although are not shown in the drawings, are readily understood from the following description. For example, while the indenting member 24 shown in the embodiment in FIG. 2 comprises a circular disk with an associated conical forming surface 26, it will be appreciated that the end-face of such an indenting member 24 need not be circular but could be any polygonal shape, provided that it is co-axial with the rivet body 12 and substantially symmetrical about such axis so as to apply a uniform indenting force against the workpiece. Similarly, the conical forming surface 26 need not be conical but could also be polygonal to reflect the specific polygonal shape of the indenting member. For example the indenting member 24 could, in fact, be square having four inclined forming surfaces extending outwardly towards the periphery of the rivet body. Similarly, while the embodiment shown in FIG. 2 utilises an indenting member 24 with perpendicular walls 29 extending parallel with the axis A, such walls 29 need not be parallel but could in fact incline relative to axis A, whereby such angle of inclination can be varied until it corresponds with the angle $\alpha$ of the conical surface, to reflect the embodiment shown in FIG. 8c. Still further, while the conical surface shown in the embodiments house a uniform angle $\alpha$ it will be appreciated that $\alpha$ could vary such that the forming surface 26 could in fact be domed as opposed to conical. Alternatively, the forming surface could also be stepped.

Also, while the preferred embodiments of self-piercing blind rivets shown in the figures utilise a flat end-face on the indenting member 24 which extends perpendicular to axis A, this end-face could in fact be domed or in fact could be pointed so as to form a further conical surface tapering towards an apex co-axial with the axis A.

While it is preferred that the mandrel head outer diameter of the embodiments shown in FIGS. 1, 8a and 8c, is equal or comparable to the outer diameter of the rivet body, it can in practice be larger, the requirement being the relative cross sectional area of the indenting member relative to the rivet body, as described above.

It is to be appreciated that all the variants discussed herein are applicable to all types of blind fastener.

Figure 4:
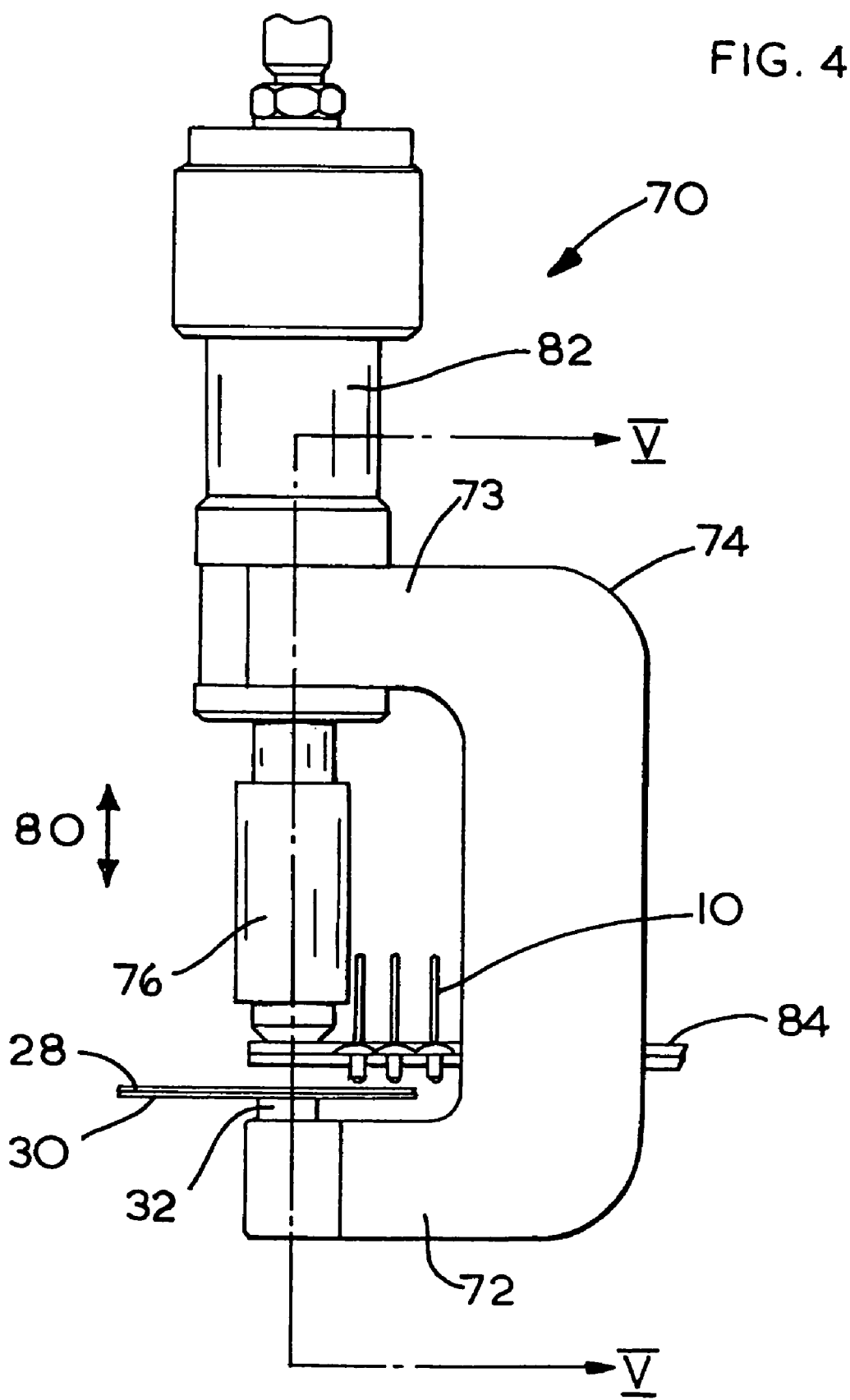
FIG. 4 is a side elevation of a combined insertion and setting tool for a self-piercing blind fastener according to the present invention.

Referring now to FIG. 4, a first embodiment of a combined insertion and setting tool for the self-piercing blind rivet of FIG. 1 is shown. Such a self-piercing riveting tool 70 comprises a conventional "C" frame 74 commonly associated with a tubular self-piercing rivets which is modified to carry the die 32 on its lower arm 72 and mounted on the upper arm 73 of the "C" frame 74 is a combined insertion and rivet setting head 76 which is better seen in FIG. 5. The combined insertion and rivet setting head 76 is linearly displaceable in a direction 80 towards and away from the die 32 by means of a hydraulic insertion ram 82. Rivets 10 are fed from a conventional vibratory bowl feeder along an appropriate raceway (not shown) to be fed, via an appropriate escapement mechanism 84, to a position beneath the insertion and setting head so as to provide automatic feeding of such rivets into the insertion and setting head 76. Such feeding, selecting and escapement parts being commonly used within the fastener industry are not described in any great detail herein.

In operation, an appropriate workpiece 28, 30 is positioned so as to lie between the combined insertion and setting head 76 and the die 32, as shown, either by manipulation of the workpiece relative to the "C" frame 74 or by movement of the "C" frame 74 relative to the workpiece by an appropriate computer controlled robotic arm (not shown).

Figure 5:
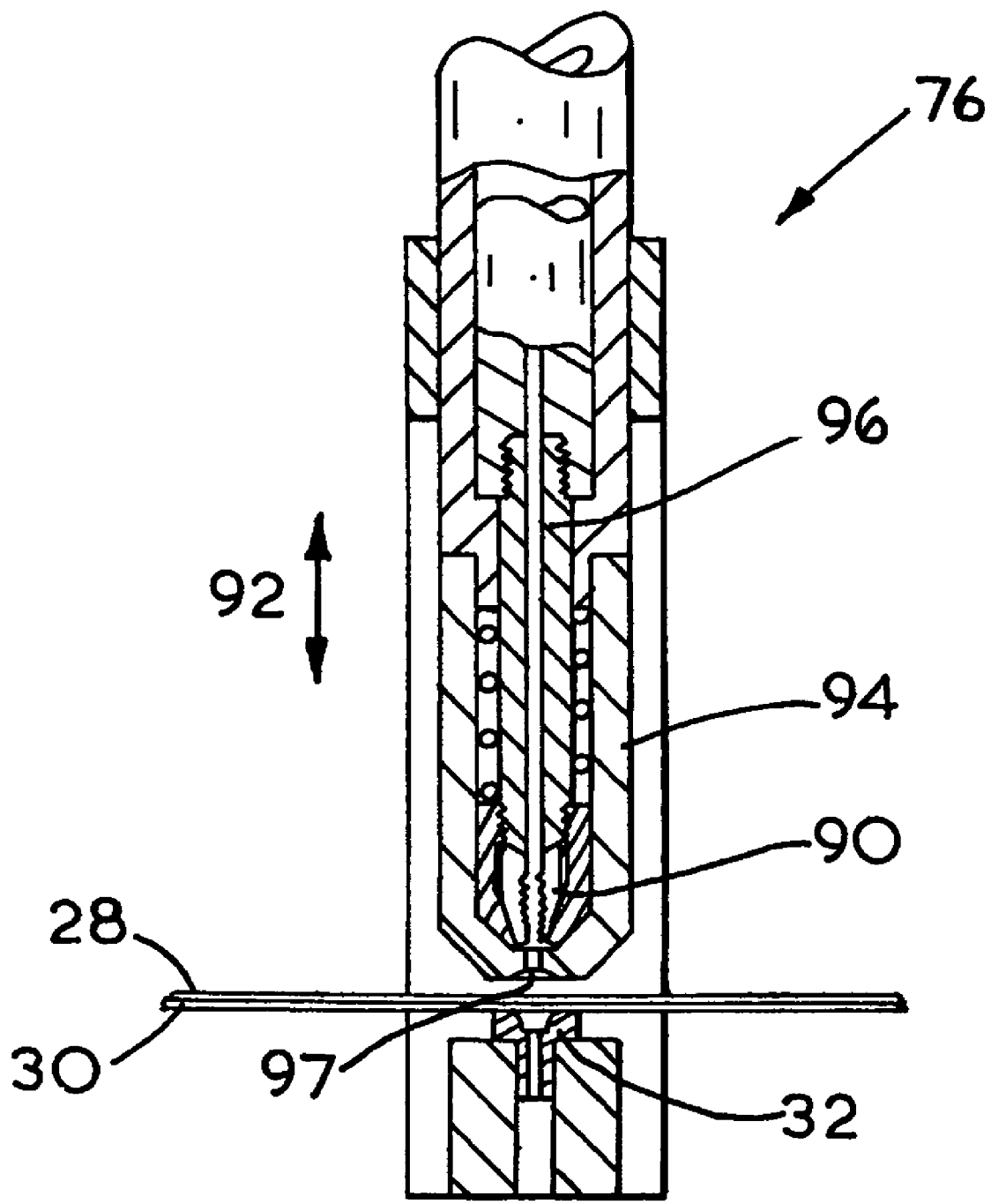
FIG. 5 is a cross sectional view along the lines V-V of the setting tool of FIG. 4.

Referring now to FIG. 5 the combined insertion and rivet setting head 76 is shown in cross section. This head 76 comprises conventional mandrel pulling jaws 90 displaceably mounted within such head to be linearly moveable in a direction 92 perpendicular to the workpiece 28, 30 and die 32. The head 76 further comprising a rigid insertion member 94 which is immoveable in respect to the head 76 itself, thereby allowing the jaws to be displaceable relative thereto as is conventional for a blind rivet setting tool. The jaws 90 are connected to an appropriate drawing bar 96 which is connected to an appropriate piston member (not shown) so as to effect appropriate displacement of the jaws 90 relative to the head 76 and the insertion member 94. The use of a piston mechanism controlled by an appropriate hydraulic or pneumatic impeller is conventional for blind rivet setting tools and readily incorporated into the present invention without need of further detailed description. In addition, as seen in FIG. 4, the entire head 76 is also displaceable in the direction 92 by operation of the appropriate ram member 82.

In operation, the head 76 is firstly raised so as to receive the mandrel 16 of an appropriate rivet 10 which will be inserted by an appropriate pusher mechanism from the escapement into a position so that the axis of the rivet 10 is coincident with a central axis of the head 76. In this position, the mandrel 16 will then be gripped by the jaw members 90 while the domed flange 14 of the rivet body will be received in a complimentary domed recess 97 within the insertion member 94. The ram 82 is then activated to displace the head 76, and specifically the insertion member 94, with the rivet inserted therein in a direction towards the workpiece 28, 30. As seen in FIG. 5 the head 76 is positioned so as to be axially aligned with the die 32 so as to position the rivet in the position relative to both the workpiece and the die substantially as shown in FIG. 1. The ram is then further activated so that the tail-end region 20 of the rivet and the indenting portion 24 are then driven under steady impact movement through the workpiece materials, as described with reference to FIG. 1, by a downward movement of the head 76. A penetration force will be transmitted from the insertion member, through the rivet body 12, to the mandrel head 18.

Once the rivet body has been driven through the workpiece such that the flange member 14 is in engagement with the upper surface thereof, the flange 14 is rigidly held in engagement with the workpiece by the ram and insertion member 94, the die is subsequently moved away from the workpiece, whereby the piston member of the head 76 (not shown) is then actuated so as to effect displacement of the drawbar 96 within the head to effect relative upward displacement of the jaws 90 within the head 76 in an upwards direction in FIG. 5, away from the workpiece so as to effect relative displacement between the mandrel head and the flange 14 of the rivet body to set the blind rivet in a conventional manner.

Figure 6:
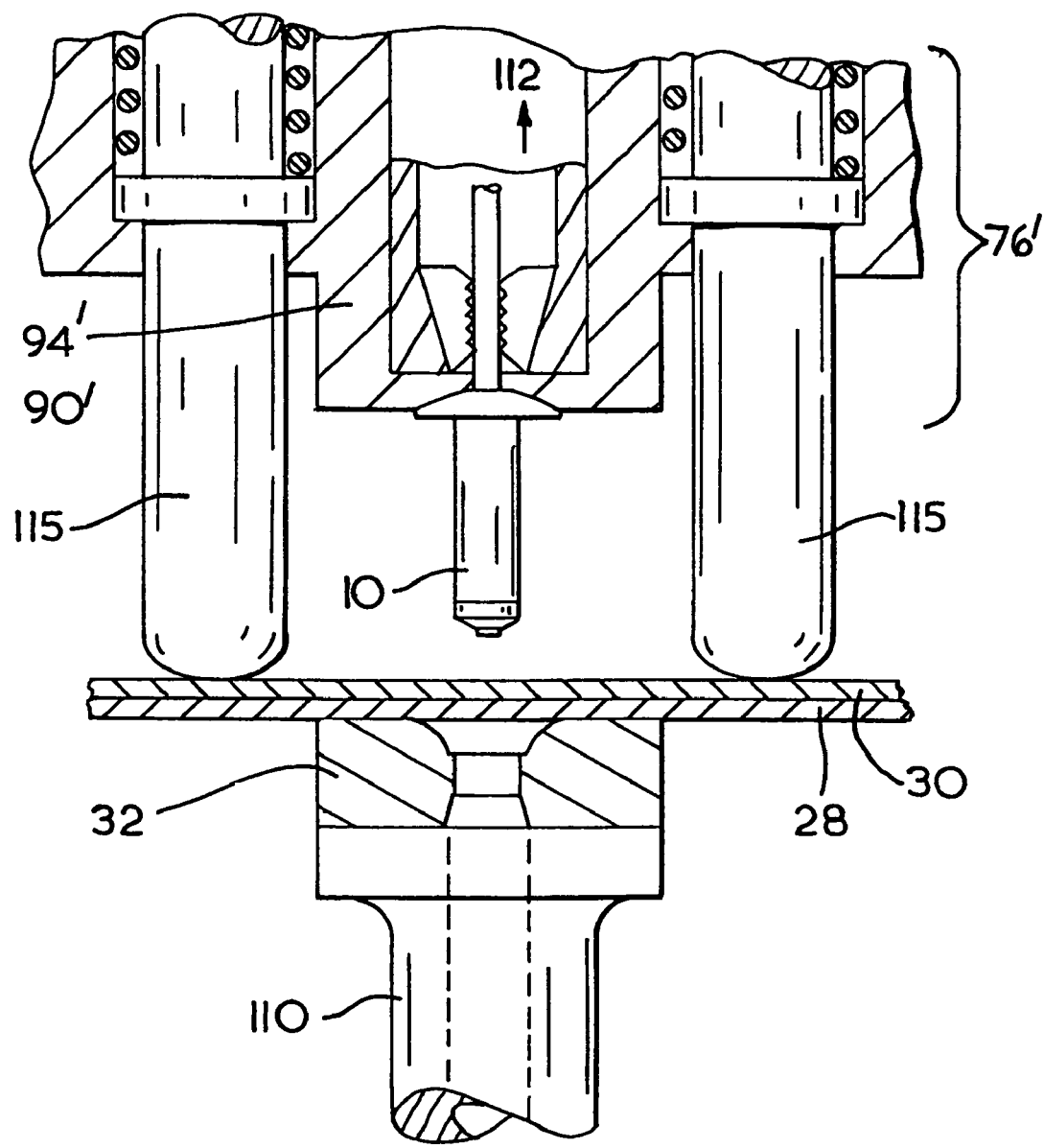
FIG. 6 is an alternative insertion and setting tool for a self-piercing blind rivet.

Referring now to FIG. 6, a modified self-piercing blind rivet system is illustrated. Here, the system is modified slightly so that instead of a ram being used to drive the combined head 76 towards the die as in the earlier embodiment, here a hydraulic ram 110 is used to drive a die 32 (with a workpiece 28, 30 mounted thereon) towards a combined insertion and setting head 76' having a stationary insertion member 94', which insertion member is rigidly attached to an appropriate rigid frame (not shown). The insertion member 94' again has an appropriate jaw member 90' displaceably mounted therein so as to effect conventional setting of the blind rivet 10 in a known manner by drawing the mandrel in a direction 112 when the rivet is to be set while the setting member 94' restrains displacement of the rivet body during setting. Here, relative displacement of the rivet 10 towards the workpiece 28, 30 to achieve self-piercing is achieved by displacement of the workpiece, by use of the die 32 towards the stationary supported rivet 10.

In the embodiment shown in FIG. 6, the self-piercing blind rivet system is further provided with two spring-loaded support pillars 115 which serve to hold the workpiece away from the rivet 10 prior to insertion, but which spring-loaded pillars may be depressed, under the action of displacement of the die 32, towards the insertion member 94' to allow the rivet to be brought into engagement with the workpieces and pierced therethrough as previously described. Once the rivet 10 has been pierced through the workpiece 28, 30, the die is again removed and the rivet may then be set by appropriate displacement of the jaw members 90' in a conventional manner. These spring-loaded pillars further serve to help facilitate removal of the workpiece material away from the insertion member once the setting has been completed and the die 32 removed.

Figure 7:
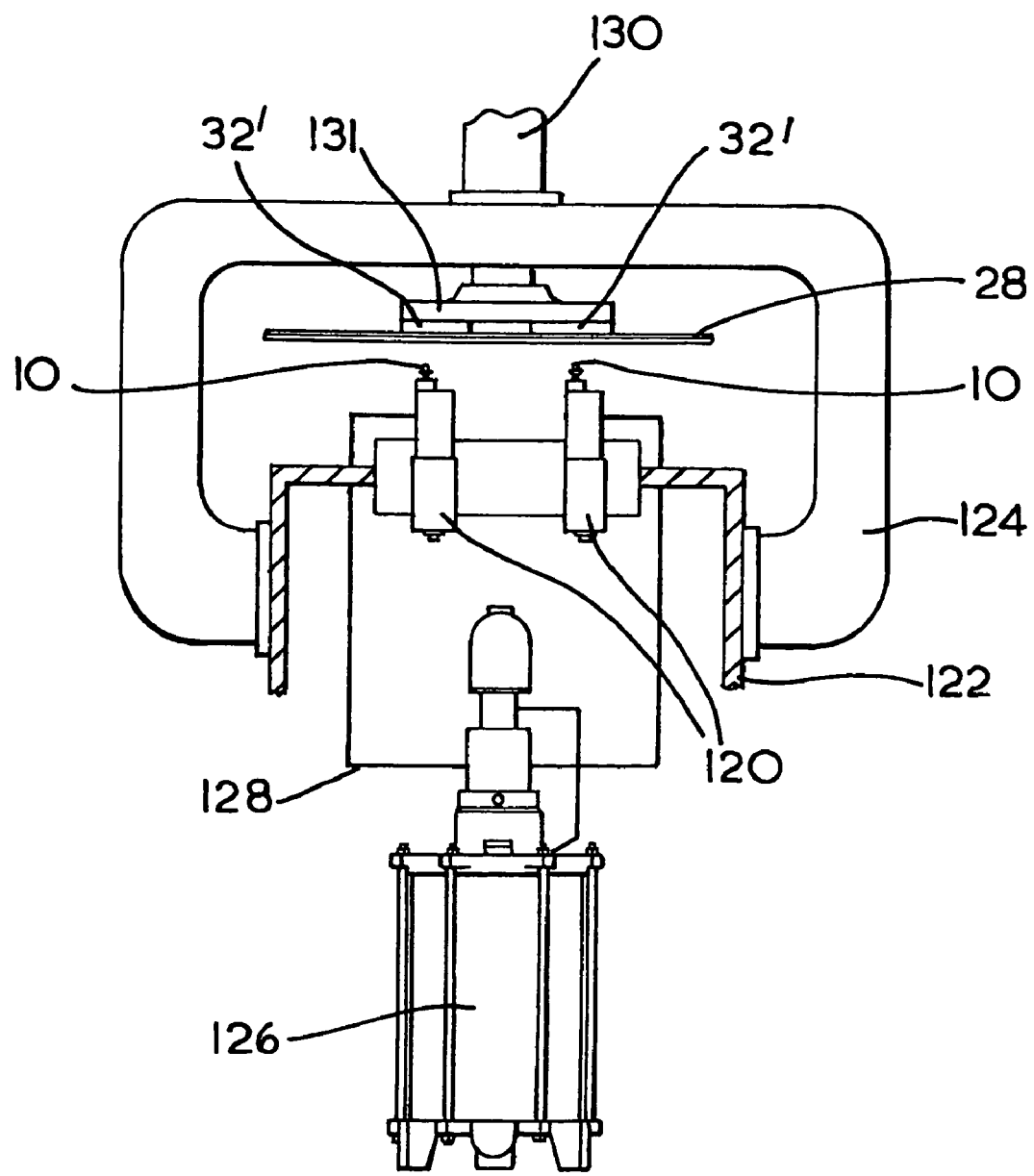
FIG. 7 is a schematic view of a self-piercing blind rivet multi-head setting system for inserting and setting self-piercing blind rivets according to the present invention.

FIG. 7 schematically illustrates the application of the self-piercing operation to a blind rivet multi-head setting system. The multi-head system shown in FIG. 7 comprises two rigidly mounted blind rivet setting heads 120 although the number of heads can vary from two to several tens. The setting heads 120 are mounted on an appropriate rigid bench 122 which also has mounted thereon an appropriate support frame 124. Each of the setting heads 120 comprises the combined insertion and setting head described with reference to FIG. 6 each of which has a conventional blind rivet setting mechanism employing internally displaceable jaws which, on actuation, will effectively draw a blind rivet mandrel into the setting head so as to effect setting of such rivet in a conventional manner. Each set of jaws ultimately controlled by an appropriate hydraulic intensifier 126 via appropriate hydraulic hoses 128 in communication with piston mechanisms (not shown) in each head 120. As for the embodiment shown in FIG. 6, each of the heads 120 receives an appropriate self-piercing blind rivet 10 and the workpiece 28 is then displaced into engagement with such rivets 10 by displacement of an appropriate die carrier 131 supporting two dies 32' (each die 32' having an appropriate bore positioned co-axially with each of the setting heads 120) and which dies 32' are driven towards the setting heads 120 by an appropriate hydraulic ram 130. Again, the relative displacement between the dies 32' and the rigidly supported rivet 10 will result in the rivets 10 being driven through the workpiece into the bores of each associated die as previously described. Once the rivet bodies have pierced the workpiece the setting heads 120 are then activated in a conventional manner to set each of the blind rivets.

In the embodiments described herein the piercing force applied to the self-piercing blind rivet is achieved by engagement of the flange member 14 with the appropriate insertion member 94 to transmit appropriate force through the cylindrical rivet body, either to its closed-end directly or to the mandrel head which is engaged with the tail-end of the body. However, it is also possible that during the piercing operation the jaw members 90 can be secured from displacement relative to the insertion member 94 so that such piercing force can also be transmitted co-jointly through the mandrel stem as well as the rivet body to the tail-end of the self-piercing blind rivet.

In the preferred embodiments described herein the mid section 38 of the bore 36 is provided so as to be of comparable diameter to that of the rivet being inserted therethrough. This, obviously, necessitates removal of the bore portion of the die prior to setting so as to allow the rivet body to be expanded as it is deformed to the configuration shown in FIG. 3. However, it is also possible that the bore 36 may have a diameter considerably greater than that of the rivet body to thereby provide appropriate support to the rear of the workpiece during the self-piercing operation but which need not be removed from providing such support during the setting operation. In such an option the bore may optionally have the throat portion removed or retained dependent on the setting requirements. While it is preferred to utilise the throat portion 40 so as to deform the rear of the workpiece to provide an appropriate support as shown in FIG. 3 this is optional. It is also possible that the die itself may be completely omitted for use during the setting of such self-piercing blind rivets if the workpieces are sufficiently thin enough and the inherent deformation of the workpieces around the pierced hole is deemed acceptable for certain fastening operations.

The invention claimed is:

1. A fastening system for inserting and setting a self piercing blind fastener in a workpiece formed of a plurality of metal sheets, said system comprising:
   a die for supporting the rear of a workpiece during insertion of said fastener;
   a combined insertion and setting tool, which combined insertion and setting tool comprising a force application mechanism and an insertion member for engaging a shell of said blind fastener and for transmitting an insertion force thereto, a mandrel engaging member for engaging a mandrel stem of said fastener, said mandrel engaging member being displaceable relative to said insertion member for effecting relative displacement of said mandrel and said shell to effect setting of said blind rivet; and
   a displacement mechanism for effecting relative displacement of said die and said combined insertion and setting tool, wherein the die for supporting a workpiece comprises a selectively engageable workpiece engaging support member having a cylindrical fastener receiving bore extending therethrough, said bore having a generally uniform mid section of constant diameter and a throat portion adjacent an outer surface of said support member, which throat portion increases in diameter towards said outer surface.

2. The fastening system as claimed in claim 1 wherein said displacement mechanism comprises a hydraulic ram operatively engaged with one of said die and said combined insertion and setting tool and a frame member supporting the other of said die and said combined insertion and setting tool, wherein the hydraulic ram is displaceable towards said frame member.

3. The fastening system as claimed in claim 1 wherein said increase in throat diameter is non-linear.

4. The fastening system as claimed in claim 1 wherein said bore comprises a radially extending shoulder between said mid-section and said throat so as to form a cutting edge in said bore.

5. A fastening system for inserting and setting a self piercing blind fastener in a workpiece, said system comprising:
   a die for supporting the rear of a workpiece during insertion of the blind fastener, wherein the die for supporting a workpiece comprises a selectively engageable workpiece engaging support member having a cylindrical fastener receiving bore extending therethrough, said bore having a generally uniform mid section of constant diameter and a throat portion adjacent an outer surface of said support member, which throat portion increases in diameter towards said outer surface;
   a setting tool having an insertion member for engaging a shell of said blind fastener and for transmitting an insertion force thereto, and a mandrel engaging member for engaging a mandrel stem of said blind fastener, said mandrel engaging member being displaceable relative to said insertion member for effecting relative displacement of said mandrel and said shell to effect setting of said blind fastener; and
   displacement mechanism for effecting relative displacement of said die and said insertion member.

6. The fastening system as claimed in claim 5 wherein said displacement mechanism comprises a ram operatively engaged with one of said die and said setting tool and a frame member supporting the other of said die and said combined insertion and setting tool.

7. The fastening system as claimed in claim 5 wherein said increase in throat diameter is non-linear.

8. The fastening system as claimed in claim 5 wherein said bore comprises a radially extending shoulder between said mid-section and said throat so as to form a cutting edge in said bore.

9. The fastening system as claimed in claim 5 wherein said blind fastener comprises an indenting member at one longitudinal end thereof remote from a flange of said blind fastener, said indenting member having a cross sectional area less than half a cross sectional area presented by a shell of said blind fastener.

10. The fastening system as claimed in claim 9 wherein said indenting member has an end face extending at least partly perpendicular to an elongate fastener axis.

11. The fastening system as claimed in claim 9 wherein said indenting member comprises a longitudinally extending side wall forming a step portion extending from a periphery of an end face towards a tail end of said cylindrical shell.

12. The fastening system according to claim 5 wherein said mandrel engaging member defines a convex surface configured to engage a surface of the shell.

* * * * *